United States Patent
Dwaraganathan et al.

(10) Patent No.: US 12,415,605 B2
(45) Date of Patent: *Sep. 16, 2025

(54) OVERHEAD STOWAGE BIN WITH ELECTRONIC CONTROL SYSTEM

(71) Applicant: B/E AEROSPACE, INC., Winston Salem, NC (US)

(72) Inventors: Sivakumar Dwaraganathan, Bangalore (IN); Frank Hashberger, Snohomish, WA (US); Rameshkumar Balasubramanian, Apple Valley, MN (US); Aravinda Mahabaleshwara, Hyderabad (IN); Rajesh Mohanam, Hyderabad (IN); Ashwin Srinivasa, Hyderabad (IN)

(73) Assignee: B/E AEROSPACE, INC., Winston Salem, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,047

(22) Filed: Jul. 23, 2024

(65) Prior Publication Data

US 2024/0375774 A1 Nov. 14, 2024

Related U.S. Application Data

(62) Division of application No. 17/136,381, filed on Dec. 29, 2020, now Pat. No. 12,077,298.

(30) Foreign Application Priority Data

Mar. 5, 2020 (IN) .............. 202041009538

(51) Int. Cl.
*B64D 11/00* (2006.01)
*E05B 47/00* (2006.01)
*E05B 81/06* (2014.01)

(52) U.S. Cl.
CPC ........ *B64D 11/003* (2013.01); *E05B 47/0012* (2013.01); *E05B 81/06* (2013.01); *E05B 2047/0094* (2013.01)

(58) Field of Classification Search
CPC ........................ H02P 29/027; B64D 11/003
See application file for complete search history.

(56) References Cited

U.S. PATENT DOCUMENTS 5,743,487 A  4/1998  Rice
7,246,771 B2 7/2007  Wisch et al.
(Continued)

FOREIGN PATENT DOCUMENTS

EP  3173329  5/2017
EP  3533711  9/2019

OTHER PUBLICATIONS

European Patent Office, European Search Report dated Jul. 7, 2021 in Application No. 21161082.9.

(Continued)

*Primary Examiner* — Christopher D Hutchens
(74) *Attorney, Agent, or Firm* — SNELL & WILMER L.L.P.

(57) ABSTRACT

A locking system for an overhead stowage bin may comprise a latch and an electromechanical actuator configured to actuate the latch. A bin controller may be electrically coupled to the electromechanical actuator. A passenger input and a master controller may be in operable communication with the bin controller.

5 Claims, 5 Drawing Sheets

(56) References Cited

U.S. PATENT DOCUMENTS

| | | | |
|---|---|---|---|
| 7,723,935 B2 | 5/2010 | Kneller et al. | |
| 7,887,008 B2 | 2/2011 | Lamoree et al. | |
| 7,893,645 B2 | 2/2011 | Kneller et al. | |
| 8,494,663 B2 | 7/2013 | Lamoree et al. | |
| 8,519,824 B1 | 8/2013 | Rankin et al. | |
| 8,657,231 B2 | 2/2014 | Burrows | |
| 8,665,119 B2 | 3/2014 | Hashberger et al. | |
| 8,876,050 B2 | 11/2014 | Wentland et al. | |
| 9,013,328 B2 | 4/2015 | Hashberger et al. | |
| 9,745,064 B2 | 8/2017 | Balasubramanian | |
| 10,189,406 B1 | 1/2019 | Pozzi et al. | |
| 10,711,500 B1 | 7/2020 | Bolton et al. | |
| 12,077,298 B2* | 9/2024 | Dwaraganathan | E05B 47/0012 |
| 2008/0078868 A1* | 4/2008 | Lamoree | B64D 11/003 244/118.1 |
| 2008/0078871 A1 | 4/2008 | Munson et al. | |
| 2011/0254705 A1 | 10/2011 | Hashberger et al. | |
| 2015/0158588 A1 | 6/2015 | Moje et al. | |
| 2017/0152044 A1 | 6/2017 | Balasubramanian | |
| 2018/0257555 A1* | 9/2018 | Simms | B60Q 3/30 |
| 2018/0261026 A1 | 9/2018 | Simms et al. | |
| 2018/0298671 A1* | 10/2018 | Roppongi | E05F 15/659 |
| 2018/0335413 A1 | 11/2018 | Jouper | |
| 2019/0212183 A1 | 7/2019 | Zajac et al. | |
| 2019/0263525 A1* | 8/2019 | Cloud | B64D 11/003 |
| 2021/0070179 A1* | 3/2021 | Wiegman | B60L 3/12 |
| 2021/0179267 A1 | 6/2021 | Heinisch | |
| 2021/0206508 A1 | 7/2021 | Cabos et al. | |

OTHER PUBLICATIONS

European Patent Office, European Search Report dated Feb. 21, 2023 in Application No. 21161082.9.
European Patent Office, European Search Report dated May 3, 2024 in Application No. 21161082.9.
USPTO; Requirement for Restriction dated Jun. 9, 2024 in U.S. Appl. No. 17/136,381.
USPTO; Non-Final Office Action dated Aug. 18, 2023 in U.S. Appl. No. 17/136,381.
USPTO; Final Office Action dated Jan. 22, 2024 in U.S. Appl. No. 17/136,381.
USPTO; Advisory Action dated Mar. 21, 2024 in U.S. Appl. No. 17/136,381.
USPTO; Notice of Allowance dated May 2, 2024 in U.S. Appl. No. 17/136,381.
USPTO; Notice of Allowance dated Jun. 12, 2024 in U.S. Appl. No. 17/136,381.
U.S. Appl. No. 17/136,381, Overhead Stowage Bin With Electronic Control System, filed Dec. 29, 2020, Sivakumar Dwaraganathan.

* cited by examiner

OVERHEAD STOWAGE BIN WITH ELECTRONIC CONTROL SYSTEM

CROSS-REFERENCE TO RELATED APPLICATIONS

This application is a divisional of, claims priority to and the benefit of, U.S. patent application Ser. No. 17/136,381, filed Dec. 29, 2020, entitled "OVERHEAD STOWAGE BIN WITH ELECTRONIC CONTROL SYSTEM" (hereinafter the '381 Application). The '381 application claims priority to and the benefit of India patent Application No. 202041009538, filed Mar. 5, 2020 and titled "OVERHEAD STOWAGE BIN WITH ELECTRONIC CONTROL SYSTEM" (hereinafter the '538 Application). The '381 and '538 Applications are hereby incorporated by reference in their entirety for all purposes.

FIELD

The present disclosure relates to stowage compartments, and, more specifically, to overhead stowage bins for aircraft.

BACKGROUND

Aircraft generally include overhead stowage bins for passengers to stow their carry-on luggage during flight. Stowing carry-on items in the overhead stowage bin is limited by bin space and the size of carry-on luggage. Carry-on luggage is generally stored on a first-come first-serve basis. Boarding delays can occur when passengers boarding in later boarding groups have difficultly determining which bins are full and which bins have sufficient storage room remaining. Further, existing bins generally do not have a locking feature. During an emergency evacuation, people may try to access the bin and remove luggage, which can delay the evacuation procedure.

SUMMARY

A locking system for an overhead stowage bin is disclosed herein. In accordance with various embodiments, the locking system may comprise a latch and an electromechanical actuator configured to actuate the latch. A bin controller may be electrically coupled to the electromechanical actuator. A passenger input may be in operable communication with the bin controller. A master controller may be in operable communication to the bin controller.

In various embodiments, a sensor may be in operable communication with the bin controller. The sensor may be configured to determine an amount of available space in the overhead stowage bin. In various embodiments, a display may be in operable communication with the bin controller.

In various embodiments, a first tangible, non-transitory memory may be configured to communicate with the bin controller. The first tangible, non-transitory memory may have instructions stored thereon that, in response to execution by the bin controller, cause the bin controller to perform a first set of operations, which may comprise receiving, by the bin controller, a signal from the passenger input; determining, by the bin controller, if the locking system is in a locked state or an unlocked state; and determining, by the bin controller, whether to output an electrical signal to the electromechanical actuator based on whether the locking system is in the locked state or the unlocked state.

In various embodiments, the first set of operations may further comprise receiving, by the bin controller, a lock command from the master controller; and determining, by the bin controller, not to output the electrical signal to the electromechanical actuator based on the lock command from the master controller.

In various embodiments, the first set of operations may further comprise outputting, by the bin controller, the electrical signal to the electromechanical actuator if the bin controller determines the locking system is in the unlocked state.

In various embodiments, a flight crew input may be in operable communication with the master controller. A second tangible, non-transitory memory may be configured to communicate with the master controller. The second tangible, non-transitory memory may have instructions stored thereon that, in response to execution by the master controller, cause the master controller to perform a second set of operations, which may comprise receiving, by the master controller, a lock signal from the flight crew input; and sending, by the master controller, a lock command to the bin controller.

In various embodiments, a display may be in operable communication with the bin controller. The first set of operations may further comprise receiving, by the bin controller, the lock command from the master controller; and commanding, by the bin controller, the display to output a locked message.

An overhead stowage bin is also disclosed herein. In accordance with various embodiments, the overhead stowage bin may, comprise a door configured for rotation about a hinge joint and a latch configured to secure the door in a closed position. An electromechanical actuator may be configured to actuate the latch. A bin controller may be electrically coupled to the electromechanical actuator. A master controller may be in operable communication with the bin controller.

In various embodiments, a first tangible, non-transitory memory may be configured to communicate with the bin controller. The first tangible, non-transitory memory may have instructions stored thereon that, in response to execution by the bin controller, cause the bin controller to perform a first set of operations, which may comprise receiving, by the bin controller, a signal from a passenger input; determining, by the bin controller, if the overhead stowage bin is in a locked state or an unlocked state; and determining, by the bin controller, whether to output an electrical signal to the electromechanical actuator based on whether the overhead stowage bin is in the locked state or the unlocked state.

In various embodiments, a second tangible, non-transitory memory may be configured to communicate with the master controller. The second tangible, non-transitory memory may have instructions stored thereon that, in response to execution by the master controller, cause the master controller to perform a second set of operations, which may comprise receiving, by the master controller, a lock signal from a flight crew input; and sending, by the master controller, a lock command to the bin controller.

In various embodiments, the first set of operations may further comprise determining, by the bin controller, not to output the electrical signal to the electromechanical actuator based on the lock command from the master controller.

In various embodiments, a sensor may be in operable communication with the bin controller. The sensor may be configured to detect a condition within the overhead stowage bin.

In various embodiments, a display may be located on the door. In various embodiments, the display may be configured to output at least one of a locked status or an available space status.

An overhead stowage bin in accordance with various embodiments, may comprise a door configured for rotation about a hinge joint and an electromechanical actuator configured to rotate the door about the hinge joint. A bin controller may be electrically coupled to the electromechanical actuator. A master controller may be in operable communication with the bin controller.

In various embodiments, a tangible, non-transitory memory may be configured to communicate with the bin controller. The tangible, non-transitory memory may have instructions stored thereon that, in response to execution by the bin controller, cause the bin controller to perform operations, which may comprise receiving, by the bin controller, a signal from a passenger input; determining, by the bin controller, if the overhead stowage bin is in a locked state or an unlocked state; and determining, by the bin controller, whether to output an electrical signal to the electromechanical actuator based on whether the overhead stowage bin is in the locked state or the unlocked state.

In various embodiments, the electromechanical actuator may be configured to rotate the door about the hinge joint in response to receiving the electrical signal from the bin controller. In various embodiments, a sensor may be in operable communication with the bin controller. The sensor may be configured to detect an obstruction in a path of the door.

In various embodiments, the instructions may further comprise receiving, by the bin controller, an output from the sensor; and determining, by the bin controller, whether to output the electrical signal to the electromechanical actuator based on the output from the sensor.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

Figure 1:
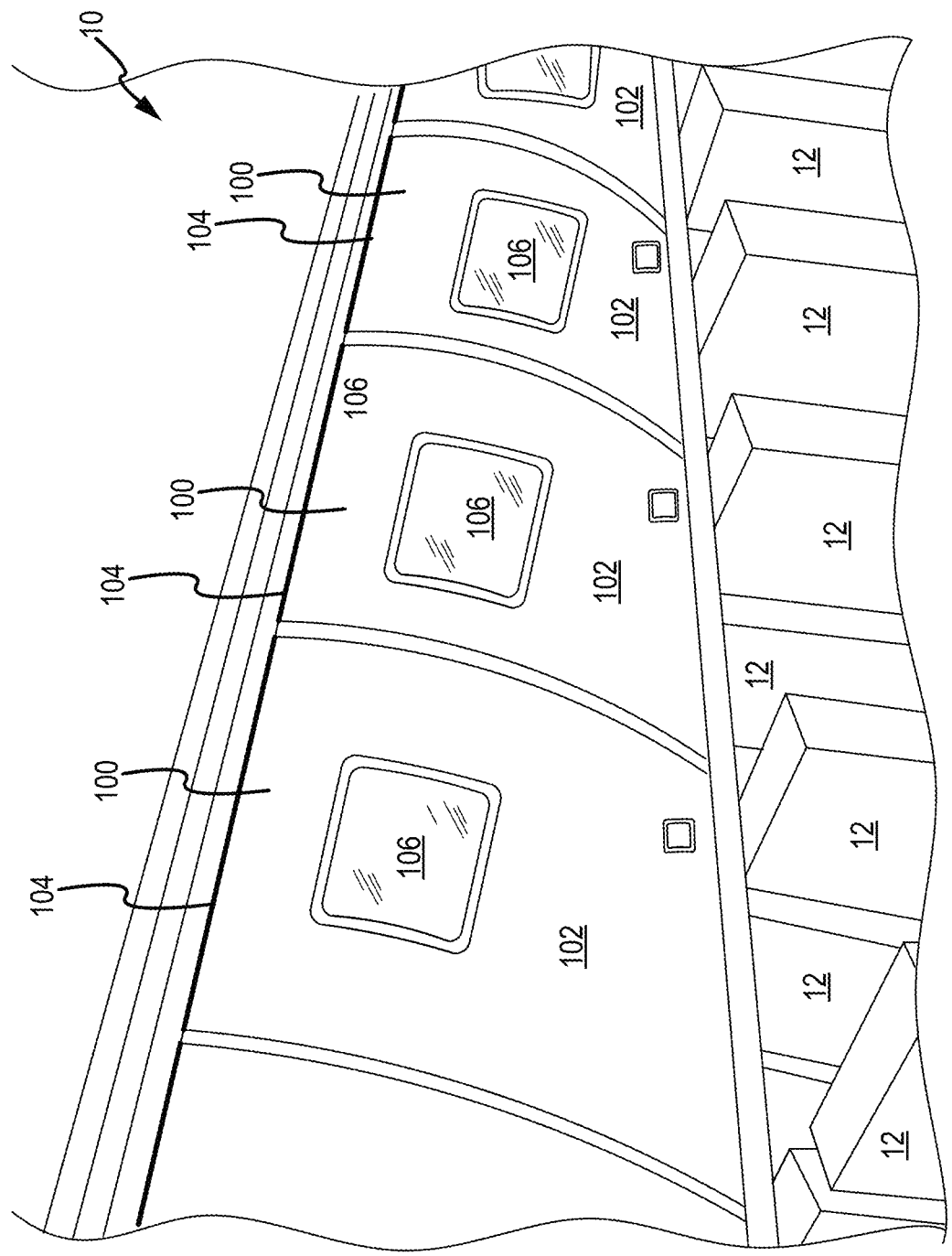
FIG. 1 illustrates a perspective view of overhead stowage bins located in the interior of an aircraft, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Disclosed herein is an overhead stowage bin having an electrically controlled locking system. In accordance with various embodiments, an electromechanical actuator (EMA) may be operationally coupled to a latch of the stowage bin. The EMA may be configured to actuate, or rotate, the latch in response to a signal from a bin controller. The bin controller may output commands to the EMA in response to receiving a signal from a passage input (e.g. a button, sensor, switch, touch pad, etc.). In various embodiments, the bin controller may be in communication with a master controller. The master controller may be configured to allow flight crew (e.g., pilot, co-pilot, flight attendants, etc.) to lock and unlock the overhead stowage bins. In various embodiments, one or more sensors located on or in the overhead stowage bin. The sensor may output information to the bin controller. In various embodiments, a display may be located on the overhead stowage bin door. The bin controller may control messages and/or information shown on the display.

System program instructions and/or controller instructions may be loaded onto a tangible, non-transitory, computer-readable medium (also referred to herein as a tangible, non-transitory memory) having instructions stored thereon that, in response to execution by the controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Referring now to FIG. 1, an aircraft interior 10 including overhead stowage bins 100 located over seats 12 is shown, in accordance with various embodiments. Overhead stowage bins 100 may each include a door 102 configured to pivot about a hinge joint 104. In various embodiments, a display 106 may be mounted to door 102.

Figure 2A:
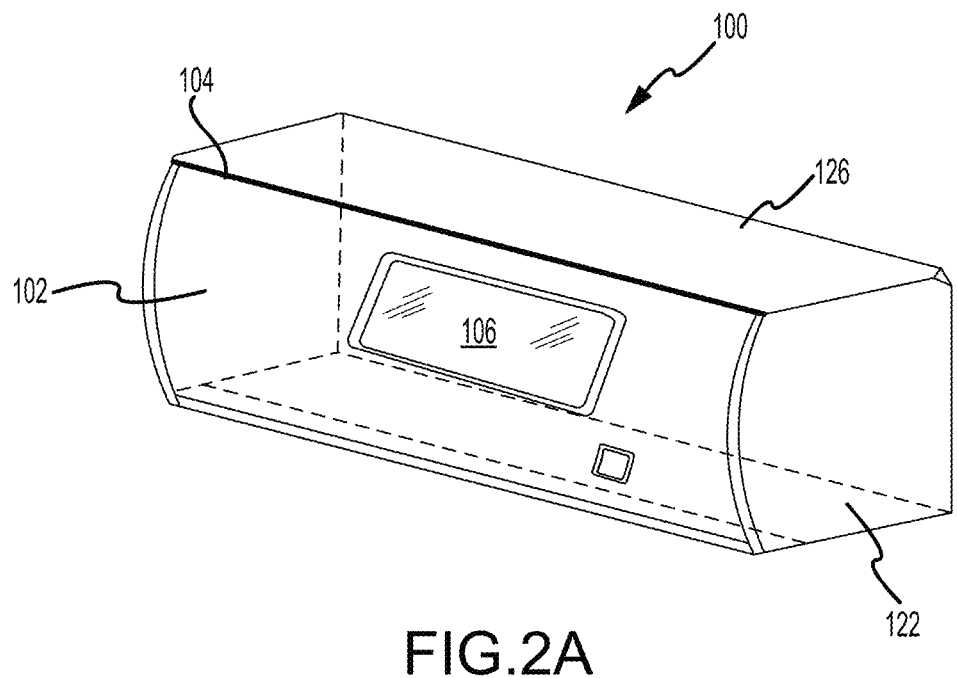
FIGS. 2A and 2B illustrate a perspective view of an overhead stowage bin in a closed position and an open position, respectively, in accordance with various embodiments.
Figure 2B:
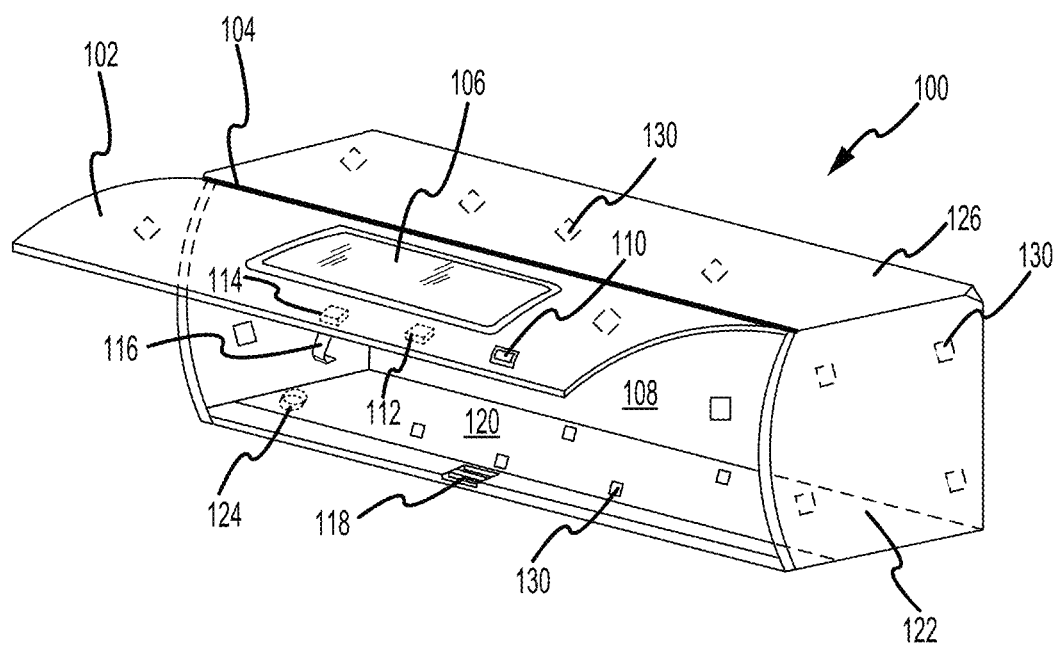

With additional reference to FIGS. 2A and 2B, an overhead stowage bin 100 is illustrated in the closed position and the open position, respectively. Overhead stowage bin 100 may define a volume 108 configured to receive and store carry-on luggage. In accordance with various embodiments, a passenger input 110 may be located on door 102. Passenger input 110 is in operable communication with a bin controller 112. Passenger input 110 may be a push button, touch pad, contactless sensor, radio frequency sensor, infrared sensor, ultra sound sensor, capacitive sensor, or any other device configured to output a signal to bin controller 112. Passenger input 110 may communicate with bin controller 112 via wired, wireless, or mechanical connection. As described in further detail below, bin controller 112 is configured to output an electrical signal in response to receiving an "open bin" signal from passenger input 110.

Bin controller 112 may be electrically coupled to and in operable communication with an EMA 114. EMA 114 is operably coupled to a latch 116 of overhead stowage bin 100. In this regard, EMA 114 is configured to actuate (e.g., rotate, pivot, translate, etc.) latch 116 in response to receiving an electrical signal from bin controller 112. Latch 116 is configured to secure door 102 in the closed position. In various embodiments, latch 116 may be configured to engage an anchor 118 affixed proximate a floor 120 of overhead stowage bin 100. Anchor 118 may be located generally opposite hinge joint 104. In accordance with various embodiments, EMA 114 may rotate latch 116 relative to anchor 118. While FIG. 2B illustrates latch 116 attached to door 102 and anchor attached to floor 120, it is contemplated and understood that latch 116 and anchor may be located in any location along door 102 and overhead stowage bin 100. For example, in various embodiments, anchor 118 may be located along a sidewall 122 of overhead stowage bin 100. Further, in various embodiments, anchor 118 may be attached to door 102 and latch 116 may be rotatably coupled to floor 120. In various embodiments, overhead stowage bin 100 may include a mechanical override 124 configured to actuate latch 116. Mechanical override 124 may be located generally out of view from passengers, which tends to prevent, or reduce a likelihood that, persons other than flight attendants will open overhead stowage bin 100 via mechanical override 124.

In various embodiments, overhead stowage bin 100 may include one or more sensors 130. Sensors 130 may be employed individually, in groups, in series, and/or in parallel to obtain information related to overhead stowage bin 100. For example, one or more sensors 130 may be configured to detect the presence of an object in the path of rotation of door 102. One or more sensors 130 may be configured to detect a position of door 102 and/or a position of latch 116. One or more sensors 130 may be configured determine a space availability with volume 108. Stated differently, one or more sensors 130 may be configured to detect occupied area within volume 108. One or more sensors 130 may be weight sensors, fire and/or smoke sensors, cabin pressure sensors, or any other desired sensor. Sensors 130 may be located along floor 120, sidewalls 122, door 102, a ceiling 126 of overhead stowage bin 100, and/or in any other desired location.

Figure 3:
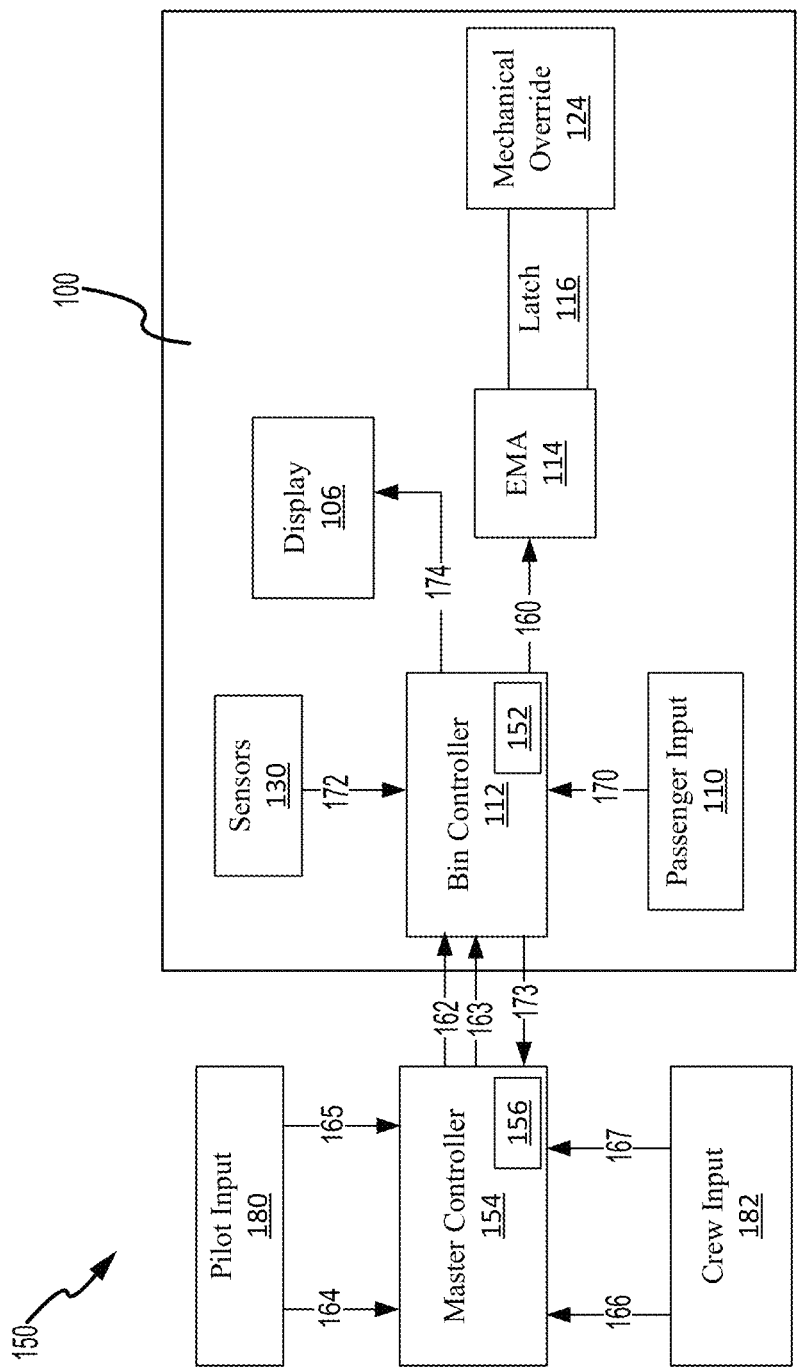
FIG. 3 illustrates a schematic of an overhead stowage bin having a locking system configured to electrically control a latch; in accordance with various embodiments.

With additional reference to FIG. 3, a schematic of a locking system 150 for overhead stowage bins 100 is illustrated. In accordance with various embodiments, locking system 150 may include the passenger input 110, the bin controller 112, the EMA 114, the latch 116, the mechanical override 124, the sensors 130, and the display 106 of each overhead stowage bin 100 within aircraft interior 10. Bin controllers 112 may each include and communicate with one or more processors and one or more tangible, non-transitory storage medium(s) 152 and is capable of implementing locking system logic. The processor can be a general purpose processor, a digital signal processor (DSP), an application specific integrated circuit (ASIC), a field programmable gate array (FPGA) or other programmable logic device (PLD), discrete gate or transistor logic, discrete hardware components, or a combination thereof. System program instructions and/or processor instructions may be loaded onto tangible, non-transitory computer-readable storage medium 152. The system program instructions and/or processor instructions may, in response to execution by bin controller 112, cause bin controller 112 to perform various operations. In particular, and as described in further detail below, the instructions may allow bin controller 112 to make operating decisions relative to EMA 114 and latch 116. For example, bin controller 112 may be configured to determine whether to send an electrical signal to EMA 114 based on whether overhead stowage bin 100 is in a locked state or an unlocked state.

In accordance with various embodiments, locking system 150 may further include a master controller 154. Master controller 154 may be in operable communication with the bin controller 112 of each overhead stowage bin 100. Master controller 154 may include and communicate with one or more processors and one or more tangible, non-transitory storage medium(s) 156 and is capable of implementing locking system logic. The processor can be a general purpose processor, a DSP, an ASIC, a FPGA or other programmable logic device, discrete gate or transistor logic, discrete hardware components, or a combination thereof. System program instructions and/or processor instructions may be loaded onto tangible, non-transitory computer-readable storage medium 156. The system program instructions and/or processor instructions may, in response to execution by master controller 154, cause master controller 154 to perform various operations. In particular, and as described in further detail below, the instructions may cause master controller 154 to send lock commands to bin controllers 112 based on pilot or crew input received by master controller 154.

Locking system 150 is configured to allow a crewmember to lock overhead stowage bins 100. For example, a pilot and/or flight attendant may desire to lock overhead stowage bins 100 during take-off or in the event of an emergency evacuation. In accordance with various embodiments, bin controller 112 may be configured to determine whether to send an electrical signal to EMA 114 based on commands received from master controller 154. In accordance with various embodiments, master controller 154 may receive lock commands 164 and unlock commands 165 from the cockpit, for example, via a pilot input 180. Pilot input 180 may be a push button, switch, touch pad, lever, contactless sensor, or any other device located in the cockpit and configured to allow a pilot to convey lock commands 164 and unlock commands 165 to master controller 154. In response to receiving a lock command 164, master controller 154 may output a lock command 162 to bin controller 112. In response to receiving lock command 162, bin controller 112 may convert to a locked state. In the locked state, bin controller 112 does not output electrical signals 160 to EMA 114. The lack of electrical signals 160 prevents EMA 114 from actuating latch 116. In this regard, in the locked state, latch 116 remains engaged to anchor 118, with momentary reference to FIG. 2B, thereby preventing door 102 from opening.

In accordance with various embodiments, master controller 154 may also receive lock commands 166 and unlock commands 167 from the cabin (e.g., from flight attendants) via a crew input 182. Crew input 182 may be a push button, switch, touch pad, lever, contactless sensor, or any other device configured to allow a flight attendant to convey lock commands 166 and unlock commands 167 to master controller 154. In response to receiving lock command 166, master controller 154 may output lock command 162 to bin controller 112. In response to receiving lock command 162, bin controller 112 may convert to the locked state. In the locked state, bin controller 112 does not output electrical signals 160 to EMA 114. The lack of electrical signals 160 prevents EMA 114 from actuating latch 116. In this regard, latch 116 remains engaged to anchor 118, with momentary reference to FIG. 2B, thereby preventing door 102 from opening.

Locking system 150 may also be translated to the unlocked state via the pilot input 180 and/or the crew input 182. For example, in accordance with various embodiments, master controller 154 may receive unlock command 165 from pilot input 180. In response to receiving unlock command 165, master controller 154 may output an unlock command 163 to bin controller 112. In response to receiving unlock command 163, bin controller 112 may convert to an unlocked state. In the unlocked state, bin controller 112 outputs electrical signals 160 to EMA 114 in response to receiving a signal (e.g., an open bin signal 170) from passenger input 110. In response to receiving electrical signals 160 from bin controller 112, EMA 114 actuates latch 116, thereby allowing door 102 to open.

In accordance with various embodiments, master controller 154 may also receive unlock commands 167 from crew input 182. In response to receiving an unlock command 167, master controller 154 may output unlock command 163 to bin controller 112. In response to receiving unlock command 163, bin controller 112 may convert to the unlocked state. In the unlocked state, bin controller 112 outputs electrical signals 160 to EMA 114, in response to bin controller 112 receiving open bin signals 170 from passenger input 110.

In accordance with various embodiments, when overhead stowage bin 100 is in the closed position, a passenger or flight attendant may open door 102 and access volume 108 by pressing, touching, or otherwise causing passenger input 110 to output an open bin signal 170 to bin controller 112. In response to receiving open bin signal 170, bin controller 112 determines whether it is in the locked state or the unlocked stated. If bin controller 112 determines it is in the unlocked, bin controller 112 outputs electrical signal 160 to EMA 114, thereby causing EMA 114 to actuate latch 116. If bin controller 112 determines it is in the locked, bin controller 112 does not output electrical signal 160 (i.e., bin controller 112 takes no action in response to receiving the open bin signal 170 from passenger input 110).

In accordance with various embodiments, bin controller 112 receives output 172 from sensors 130. Bin controller 112 may output signals 173 correlating to the information received from sensors 130 to master controller 154. Stated differently, sensors 130 may interface with bin controller 112 and bin controller 112 may communicate the information from sensors 130 to master controller 154. Master controller 154 may process the information from sensors 130 and provide information to flight crew about the status of overhead stowage bins 100. In various embodiments, bin controller 112 and/or master controller 154 may manipulate the information displayed on display 106 in response to information provided by sensors 130. The information from sensors 130 may be employed to notify flight crew of an issue which requires attention, or to provide direct feedback through the display 106 to passengers using the overhead stowage bin 100. The communication between sensors 130 bin controller 112 and between bin controller 112 and master controller 154 may be wireless based (such as Wi-Fi, Bluetooth, Near Field Communication, etc.) or wired based (such as Controller Area Network, Ethernet, etc.)

Bin controller 112 may also be in communication with display 106. Stated differently, bin controller 112 is operationally coupled to display 106. Bin controller 112 is configured to send display commands 174 to display 106. Display commands 174 may be based on output 172 from sensors and/or on commands (e.g., lock commands 162, unlock commands 163, or any other command) received from master controller 154. In response to receiving display command 174, display 106 generates and/or manipulates an image or message on display 106 to convey information corresponding to the display command 174. Display 106 may be configured to output information via text, symbols, pictures, illumination of LEDs, or any other desired format. Display commands 174 may correspond to a locked status of latch 116 (e.g., unlocked state or locked state) or amount of available space within volume 108 of overhead stowage bin 100 (e.g., full, almost full, empty, 25% full, 50% full, 75% full, etc.). Conveying information related to the amount of available space within volume 108 may decrease passenger boarding times, as passengers and crew will be able to quickly and easily identify which overhead bins they can stow luggage in. In various embodiments, display 106 may output commercial advertisements, seat number information, directions to exits, time to destination, and/or any other desired message.

Locking latch 116 and/or preventing release of latch 116 via electrical means provides a generally failsafe locking system. Locking system 150 can enhance the safety of overhead stowage bins by restricting access to baggage in the event of an aircraft evacuation or during periods of turbulence, when items can fall from the overhead stowage bins and injure passenger. Locking system 150 may decrease passenger boarding times by allowing crew to unlock the overhead bins located over the seat rows that are currently boarding and lock the overhead bins located over seat rows that have not yet boarded and/or lock the overhead bins that are full.

Figure 4:
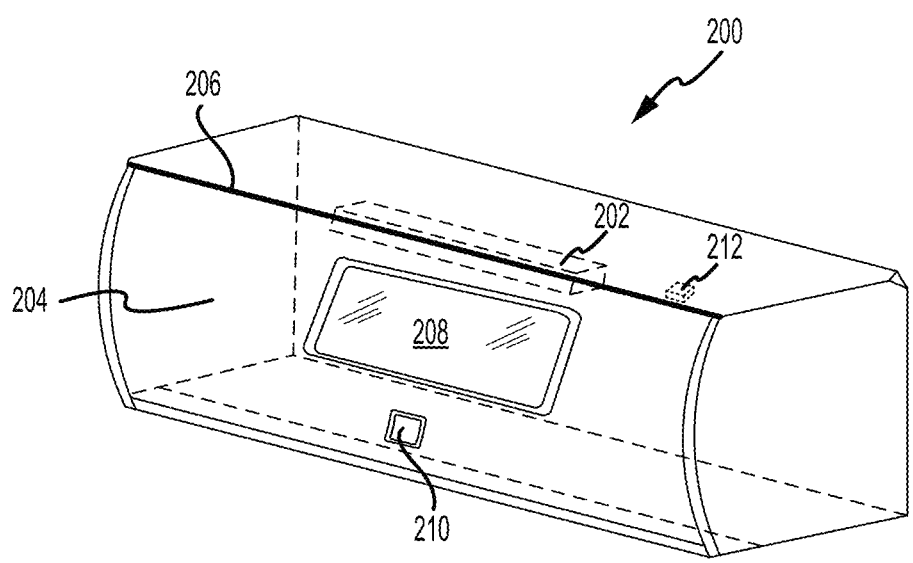
FIG. 4 illustrates a perspective view of an overhead stowage bin having an electrically controlled door; in accordance with various embodiments.

With reference to FIG. 4, an overhead stowage bin 200 including an electric motor 202 is illustrated. Overhead stowage bin 200 may be similar to overhead stowage bin 100 in FIGS. 2A and 2B. Aircraft interior 10, with momentary reference to FIG. 1, may include one or more overhead stowage bins 200 in place of one or more of the overhead stowage bins 100. Electric motor 202 may be configured to actuate (e.g., rotate, pivot, etc.) a door 204 of overhead stowage bin 200 about a hinge joint 206. Overhead stowage bin 200 includes a display 208 and a passenger input 210, similar to similar to display 106 and passenger input 110, respectively, in FIG. 2A, FIG. 2B and FIG. 3. Passenger input 210 is in operable communication with a bin controller 212. Passenger input 210 may communicate with bin controller 212 via wired, wireless, or mechanical connection. Bin controller 212 is operably coupled to electric motor 202. Bin controller 212 is configured to control actuation of electric motor 202, and thus the rotation of door 204 about hinge joint 206, by outputting electrical signals to electric motor 202. Bin controller 212 may configured to output an electrical signal configured to rotate door 204 in a first circumferential direction about hinge joint 206 (e.g., to an open position) in response to receiving a signal from passenger input 210. For example, in response to receiving a signal from passenger input 210, bin controller 212 may determine a position of door 204 and/or whether overhead stowage bin 200 is in a locked or unlocked state.

Figure 5:
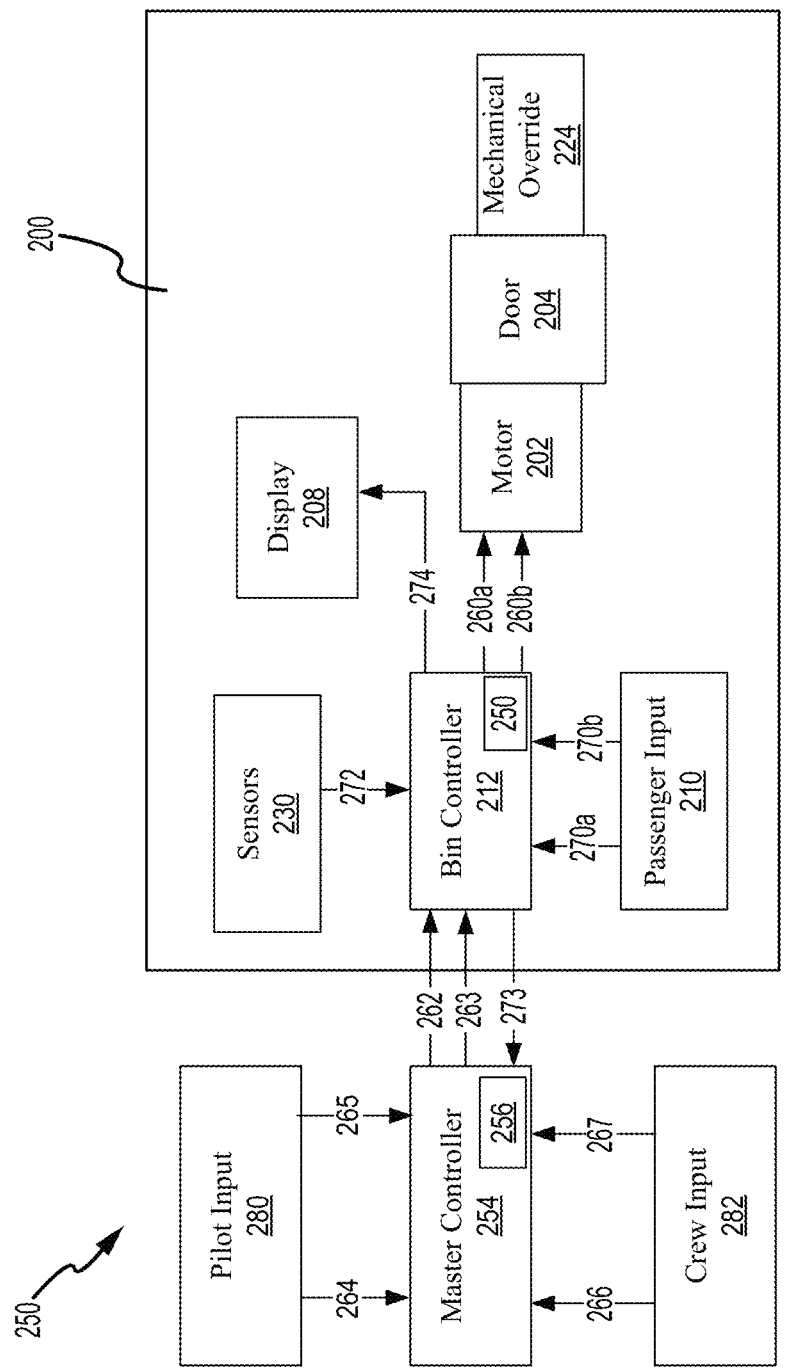
FIG. 5 illustrates a schematic of an overhead stowage bin having an electrically controlled door; in accordance with various embodiments.

With additional reference to FIG. 5, a schematic of a locking system 250 configured to control the opening and closing of door 204 is illustrated. In accordance with various embodiments, locking system 250 may include the passenger input 210, the bin controller 212, the electric motor 202, sensors 230, and the display 208 of each overhead stowage bin 200 within an aircraft interior. Bin controllers 212 may each include and communicate with one or more processors and one or more tangible, non-transitory storage medium(s) 252 and are capable of implementing locking system logic. System program instructions and/or processor instructions may be loaded onto tangible, non-transitory computer-readable storage medium 252. The system program instructions and/or processor instructions may, in response to execution by bin controller 212, cause bin controller 212 to perform various operations. In particular, and as described in further detail below, the instructions may allow bin controller 212 to make operating decisions relative to electric motor 202. For example, bin controller 212 may be configured to determine whether to send an electrical signal to electric motor 202 based on whether the overhead stowage bin 200 is in a locked state or an unlocked state.

In accordance with various embodiments, locking system 250 further includes a master controller 254. Master controller 254 may be in operable communication with the bin controller 212 of each overhead stowage bin 200. Master controller 254 may include and communicate with one or more processors and one or more tangible, non-transitory storage medium(s) 256 and is capable of implementing locking system logic. The system program instructions and/or processor instructions may, in response to execution by master controller 254, cause master controller 254 to perform various operations. In particular, and as described in further detail below, the instructions may cause master controller 254 to send lock and unlock commands to bin controllers 212 based on pilot or flight attendant input received by master controller 254.

In accordance with various embodiments, bin controller 212 receives output 272 from sensors 230. Bin controller 212 may output signals 273 correlating to the information received from sensors 230 to master controller 254. Master controller 254 may process the information from sensors 230 and send commands to bin controller 212 and/or provide information to flight crew about the status of overhead stowage bins 200 based on the sensor output 272. In various embodiments, bin controller 212 and/or master controller 254 may manipulate the information displayed on display 208 in response to information provided by sensors 230. The information from sensors 230 may be employed to notify flight crew of an issue which requires attention, or to provide direct feedback through the display 208 to passengers using the overhead stowage bin 200. Bin controller 212 may also be in communication with display 208. Bin controller 212 is configured to send display commands 274 to display 208, similar to bin controller 212 and display 106 in FIG. 3. The communication between sensors 230 bin controller 212 and between bin controller 212 and master controller 254 and between bin controller 212 and display 208 may be wireless based (such as Wi-Fi, Bluetooth, Near Field Communication, etc.) or wired based (such as Controller Area Network, Ethernet, etc.)

Locking system 250 is configured to allow a crewmember to lock overhead stowage bins 200. For example, a pilot and/or flight attendant may desire to lock overhead stowage bins 200 during take-off or in the event of an emergency evacuation. In accordance with various embodiments, master controller 254 may receive lock commands 264 and unlock commands 265 from the cockpit via a pilot input 280, similar to pilot input 180 in FIG. 3. Master controller 254 may also receive lock commands 266 and unlock commands 267 from the cabin (e.g., from flight attendants) via a crew input 282, similar to crew input 182 in FIG. 3. In response to receiving a lock command 264 and/or lock command 266, master controller 254 may output a lock command 262 to bin controllers 212. In response to receiving lock command 262, bin controller 212 may convert to a locked state. In the locked state, bin controller 212 does not output electrical signals to electric motor 202. The lack of electrical signals prevents electric motor 202 from actuating door 204. In this regard, in the locked state, door 204 of overhead stowage bin 200 may be prevented from opening.

Locking system 150 may also be translated to the unlocked state via pilot input 280 and/or the crew input 282. For example, in accordance with various embodiments, master controller 254 may receive unlock command 265 from pilot input 180. In response to receiving unlock command 265 and/or unlock command 267, master controller 254 may output an unlock command 263 to bin controllers 212. In response to receiving the unlock command 263, bin controllers 212 may convert to an unlocked state. In the unlocked state, bin controller 212 outputs electrical signals 260a or electrical signals 260b (depending on the desired direction of rotation of door 204) to electric motor 202, in response to receiving an input signal (e.g., an open bin signal 270a or a close bin signal 270b) from passenger input 210. In various embodiments, open commands and/or close commands configured to cause bin controllers 212 to output electrical signals configured to cause electric motor 202 to open door 204 and/or close door 204 may also be sent from crew input 282 and/or pilot input 280 via master controller 254.

In accordance with various embodiments, when overhead stowage bin 200 is in the closed position, a passenger or flight attendant may open door 204 by pressing, touching, or otherwise causing passenger input 210 to output an open bin signal 270a to bin controller 212. In response to receiving an open bin signal 270a, bin controller 212 determines whether it is in the locked state or the unlocked stated. If bin controller 212 determines it is in the unlocked state, bin controller 212 outputs electrical signal 260a to electric motor 202, thereby causing electric motor 202 to rotate about hinge joint 206 in a first circumferential direction. If bin controller 212 determines it is in the locked state, bin controller 212 does not output electrical signal 260a (i.e., bin controller 212 takes no action in response to receiving the open bin signal 270a from passenger input 210). Overhead stowage bin 200 may also include a mechanical override 224 configured to actuate door 204 about hinge joint 206 should electric motor 202 fail.

In various embodiments, in response to receiving open bin signal 270a, bin controller 212 may also determine a position of door 204 based on output 272 from sensors 230. In this regard, bin controller 212 may output electrical signal 260a to electric motor 202 if bin controller 212 determines that it is in the unlocked state and that door 204 is not in a fully open position. If bin controller 212 determines that it is in the locked state or that door 204 is in the fully open position (i.e., door 204 cannot be rotated any farther in the first circumferential direction), bin controller 212 does not output electrical signal 260*a* (i.e., bin controller 212 takes no action in response to receiving the open bin signal 270*a* from passenger input 210).

In accordance with various embodiments, when overhead stowage bin 200 is in an open position (e.g., partially open or fully open), a passenger or flight attendant may close door 204 by pressing, touching, or otherwise causing passenger input 210 to output a close bin signal 270*b* to bin controller 212. In response to receiving close bin signal 270*b*, bin controller 212 determines whether it is in the locked state or the unlocked stated. If bin controller 212 determines it is in the unlocked state, bin controller 212 outputs electrical signal 260*b* to electric motor 202, thereby causing electric motor 202 to rotate about hinge joint 206 in a second circumferential direction, opposite the first circumferential direction. If bin controller 212 determines it is in the locked state, bin controller 212 does not output electrical signal 260*b* (i.e., bin controller 212 takes no action in response to receiving the close bin signal 270*b* from passenger input 210). In various embodiments, overhead stowage bin 200 is configured such that door 204 may also be closed by a passenger or crewmember physically applying a force to door 204 that rotates door 204 about hinge joint 206.

In various embodiments, in response to receiving a close bin signal 270*b*, bin controller 212 may also determine whether to send electrical signal 260*b* to electric motor 202 based on a position of door 204. Bin controller 212 may determine the position of door 204 based on output 272 from sensors 230. For example, bin controller 212 may output electrical signal 260*b* to electric motor 202 if, in response to receiving close bin signal 270*b*, bin controller 212 determines that it is in the unlocked state and that door 204 is not in a fully closed position. If bin controller 212 determines that it is in the locked state or that door 204 is in the fully closed position (i.e., door 204 cannot be rotated any farther in the second circumferential direction), bin controller 212 does not output electrical signal 260*b* (i.e., bin controller 212 takes no action in response to receiving the close bin signal 270*b* from passenger input 210). In various embodiments, one or more sensors 230 may be configured to detect the presence of an object in the path of door 204. In this regard, bin controller 212 may determine not to send electrical signal 260*b* (or electrical signal 260*a*) in response to receiving output 272 from sensor 230 that indicates an object is in the path of door 204. In this regard, controlling door 204 via electric motor 202 may increase safety and/or reduce probability of damage to luggage and/or door 204.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An overhead stowage bin, comprising:
   a door configured for rotation about a hinge joint;
   an electric motor configured to rotate the door about the hinge joint;
   a bin controller electrically coupled to the electric motor;
   a first sensor in operable communication with the bin controller, wherein the first sensor is a cabin pressure sensor, and wherein the first sensor is configured to be located along at least one of a floor, a sidewall, the door, or a ceiling of the overhead stowage bin; and
   a display in operable communication with the bin controller, wherein the bin controller is configured to send a display command to the display, wherein the display command is based on an output received from the first sensor and corresponds to a cabin pressure within the overhead stowage bin, and wherein, in response to receiving the display command, the display generates at least one of an image or message to convey the cabin pressure within the overhead stowage bin.

2. The overhead stowage bin of claim 1, further comprising a tangible, non-transitory memory configured to communicate with the bin controller, the tangible, non-transitory memory having instructions stored thereon that, in response to execution by the bin controller, cause the bin controller to perform operations comprising:
   receiving, by the bin controller, a signal from a passenger input;
   determining, by the bin controller, if the overhead stowage bin is in a locked state or an unlocked state; and determining, by the bin controller, whether to output an electrical signal to the electric motor based on whether the overhead stowage bin is in the locked state or the unlocked state.

3. The overhead stowage bin of claim 2, wherein the electric motor is configured to rotate the door about the hinge joint in response to receiving the electrical signal from the bin controller.

4. The overhead stowage bin of claim 3, further comprising a second sensor in operable communication with the bin controller, wherein the second sensor is configured to detect an object in a path of the door.

5. The overhead stowage bin of claim 4, wherein the instructions further comprise:
    receiving, by the bin controller, an output from the second sensor; and
    determining, by the bin controller, whether to forward the electrical signal to the electric motor based on the output from the second sensor.

* * * * *